(12) United States Patent
Huot-Marchand et al.

(10) Patent No.: US 12,326,174 B2
(45) Date of Patent: Jun. 10, 2025

(54) ROLLING-ELEMENT BEARING WITH SEALS AND PURGING CHANNEL

(71) Applicant: AKTIEBOLAGET SKF, Gothenburg (SE)

(72) Inventors: Marie-Joelle Huot-Marchand, Diges (FR); Vincent Bredoire, Pourrain (FR)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 18/530,412

(22) Filed: Dec. 6, 2023

(65) Prior Publication Data
US 2024/0200607 A1     Jun. 20, 2024

(30) Foreign Application Priority Data

Dec. 20, 2022   (DE) ......................... 102022214033.8

(51) Int. Cl.
*F16C 19/18*    (2006.01)
*F16C 33/72*    (2006.01)
*F16C 33/78*    (2006.01)

(52) U.S. Cl.
CPC .......... *F16C 33/7823* (2013.01); *F16C 19/18* (2013.01); *F16C 33/726* (2013.01);
(Continued)

(58) Field of Classification Search
CPC .... F16C 19/18; F16C 33/736; F16C 33/7823; F16C 33/783; F16C 33/7886; F16C 33/7896; F16C 2300/14; F16J 15/004
See application file for complete search history.

(56) References Cited

U.S. PATENT DOCUMENTS 4,395,140 A * 7/1983 Sable ................... F16C 19/381
                                                         384/593
11,022,176 B2   6/2021 Delaby et al.
(Continued)

FOREIGN PATENT DOCUMENTS

DE      102011016185 B4    12/2022
EP           2806190 B1     3/2017

OTHER PUBLICATIONS

Extended European Search Report from the European Patent Office dated Apr. 23, 2024 in related EP application No. 23 216 756.9 including Search Opinion and Search Report.
(Continued)

*Primary Examiner* — Phillip A Johnson
(74) *Attorney, Agent, or Firm* — J-TEK LAW PLLC; Scott T. Wakeman; Mark A. Ussai

(57) ABSTRACT

A rolling-element bearing includes first and second concentric ring assemblies. The first ring assembly has a first rolling ring and a first sealing ring abutting axially at a joint, and the first sealing ring supports a first seal element and a second seal element located axially between the first sealing element and the first rolling ring. The second ring assembly has a second rolling ring and a second sealing ring mounted axially at a joint, and rolling elements support the ring assemblies for relative rotation. The first and second seal elements have lips in contact with the second sealing ring, and the lips delimit a first chamber between the first and second sealing rings. The first lip and the second lip extend obliquely toward each other, and a first purging channel extends from the first chamber to an external surface of the first ring assembly.

11 Claims, 4 Drawing Sheets

(52) U.S. Cl.
CPC ........ *F16C 33/783* (2013.01); *F16C 33/7886* (2013.01); *F16C 33/7896* (2013.01); *F16C 2300/14* (2013.01)

(56) References Cited

U.S. PATENT DOCUMENTS

| | | |
|---|---|---|
| 11,371,613 B2 | 6/2022 | Mandou et al. |
| 2013/0039611 A1 | 2/2013 | Russ et al. |
| 2014/0191508 A1 | 7/2014 | Schröppel et al. |
| 2014/0346738 A1 | 11/2014 | Rusch et al. |
| 2019/0011050 A1 | 1/2019 | Vincent et al. |
| 2019/0323554 A1 | 10/2019 | Delaby et al. |
| 2019/0323559 A1* | 10/2019 | Delaby ................ F16C 33/783 |
| 2022/0341543 A1 | 10/2022 | Kreutzkaemper et al. |

OTHER PUBLICATIONS

Unpublished U.S. Appl. No. 18/530,351, Marie-Joelle Huot-Marchand, filing date: Dec. 6, 2023.
Unpublished U.S. Appl. No. 18/530,365, Matthias Hofmann, filing date: Dec. 6, 2023.
Unpublished U.S. Appl. No. 18/530,379, Marie-Joelle Huot-Marchand, filing date: Dec. 6, 2023.

* cited by examiner

ROLLING-ELEMENT BEARING WITH SEALS AND PURGING CHANNEL

CROSS-REFERENCE

This application claims priority to German patent application no. 10 2022 214 033.8 filed on Dec. 20, 2023, the contents of which are fully incorporated herein by reference.

TECHNOLOGICAL FIELD

The present disclosure relates to the field of rolling-element bearings, and in particular to the field of large diameter rolling-element bearings having an inner ring and an outer ring arranged concentrically about an axis of rotation running in an axial direction and having a purging channel.

BACKGROUND

Such large-diameter rolling-element bearings may be used for example in marine applications, for example in a tidal or marine turbine power station or in a tunnel boring machine or in a mining extraction machine or in a wind turbine.

A large-diameter rolling-element bearing generally comprises two concentric inner and outer rings and at least one row of rolling elements, such as rollers or balls, arranged between the rings. The bearing also comprises seals disposed between the inner and outer rings to define a closed space inside which the rolling elements are arranged.

Large-diameter rolling-element bearings are generally used in aggressive environments, in particular in marine applications. Seals prevent exterior elements, such as dust, abrasive particles, water and marine species, for example plankton and algae, from getting inside the bearing and damaging its components. Those exterior elements may also degrade the seal itself, leading to a reduction in the seal service life.

Generally, a plurality of additional adjacent seals is provided on the bearing front side which is directly in contact with the aggressive environments, for example with the saltwater. These additional seals are fixed to a sealing ring of one of the inner and outer rings and comprise a lip in sliding contact with a running surface of a sealing ring of the other ring. Hence, several adjacent closed outer chambers are delimited between the lips of the adjacent seals.

If water starts to enter inside the rolling-element bearing, by first entering inside the first outer seal chamber, it is desired to prevent the water or pollution from moving further inside the bearing and reaching the rolling space.

This water ingress problem can occur in most of the applications, but in particular for immersed applications such as in a tidal turbine.

SUMMARY

One aim of the present disclosure is to overcome this drawback.

The disclosure relates to a rolling-element bearing comprising a first ring assembly and a second ring assembly capable of rotating concentrically relative to one another, and at least one row of rolling elements arranged between first and second raceways of the first and second ring assemblies.

The first ring assembly comprises at least one first rolling ring provided with the first raceway and at least one first sealing ring secured to the first rolling ring. The second ring assembly comprises at least one second rolling ring provided with the second raceway and at least one second sealing ring secured to the second rolling ring.

The rolling-element bearing further comprises at least first and second successive seals supported by the first sealing ring of the first ring assembly and each having at least one lip coming into contact with the second sealing ring of the second ring assembly, the lips of the first and second successive seals delimiting between the first and second sealing rings a first chamber.

According to a first general feature, the lips of the first and second seals extend obliquely one towards the other.

According to a second general feature, at least a first purging channel is extending through the first sealing ring of the first ring assembly and the first purging channel comprises at least one inlet orifice opening into the first chamber and at least one outlet orifice opening on an external surface of the sealing ring of the first ring assembly which is accessible from the outside of the rolling-element bearing.

Thanks to the disclosure, in the event that fluid such water enters the first sealed chamber, it is evacuated through the first purging channel to the outlet orifice(s). This leads to optimize sealing performance of the first and second successive seals and avoids the need to change these seals too often.

The fluid can circulate through the first purging channel thanks to gravity force and/or under the effect of a pump connected to the outlet orifice(s).

In one embodiment, the outlet orifice of the first purging channel opens on a frontal surface of the sealing ring of the first ring assembly which is axially opposite the first rolling ring.

In one embodiment, the rolling-element bearing further comprises at least one closing element removably attached at the outlet orifice of the first purging channel.

Preferably, the closing element is made of transparent material so that one can visually detect the presence of contaminant fluid during an inspection of the bearing. In such case, the closing element can be removed and placed back in position after the fluid has been purged.

The closing element may be a plug. Alternatively, the closing element may be a collector to collect fluid.

The rolling-element bearing may further comprise at least a third seal supported by the first sealing ring of the first ring assembly and axially located inwards with respect to the first and second seals, the third seal being provided with at least one lip coming into contact with the second sealing ring of the second ring assembly, the lips of the second and third seals delimiting between the first and second sealing rings a second chamber.

In this case, the rolling-element bearing may advantageously comprise at least a second purging channel extending through the second ring assembly and comprising at least one inlet orifice opening into the second chamber and at least one outlet orifice opening on an external surface of the second ring assembly which is accessible from the outside of the rolling-element bearing.

In one embodiment, the second purging channel is extending through the sealing ring of the second ring assembly.

In one embodiment, the rolling-element bearing further comprises at least one closing element removably attached at the outlet orifice of the second purging channel. Preferably, this closing element is made of transparent material. This closing element may be a plug. Alternatively, the closing element may be a collector to collect fluid.

In one embodiment, the rolling-element bearing further comprises at least a fourth seal supported by the first sealing ring of the first ring assembly and axially located inwards with respect to the third seal, the fourth seal being provided with at least one lip coming into contact with the second sealing ring of the second ring assembly, the lips of the third and fourth seals delimiting between the first and second sealing rings a third chamber.

In this case, the rolling-element bearing may advantageously comprise at least a third purging channel extending through the second ring assembly and comprising at least one inlet orifice opening into the third chamber and at least one outlet orifice opening on a surface of the second ring assembly which is accessible from the outside of the rolling-element bearing.

The rolling-element bearing may further comprise at least one closing element removably attached at the outlet orifice of the third purging channel. Preferably, this closing element is made of transparent material. This closing element may be a plug. Alternatively, the closing element may be a collector to collect fluid.

In one embodiment, the sealing ring of the first ring assembly is formed as a split ring and comprises at least two part rings (ring sections) axially stacked, the first and second seals being each supported by one of these two part rings.

In one embodiment, the rolling-element bearing further comprises, axially on each side of the first and second rolling rings of the first and second ring assemblies, seals delimiting radially between the first and second rolling rings a closed rolling space inside which is housed the row of rolling elements, the seals being distinct from the first and second successive seals.

In one embodiment, the first ring assembly is the inner ring and the second ring assembly is the outer ring. Alternatively, the first ring assembly is the outer ring and the second ring assembly is the inner ring.

BRIEF DESCRIPTION OF THE DRAWINGS

The present disclosure and its advantages will be better understood by studying the detailed description of specific embodiments given by way of non-limiting examples and illustrated by the appended drawings in which.

DETAILED DESCRIPTION

Figure 1:
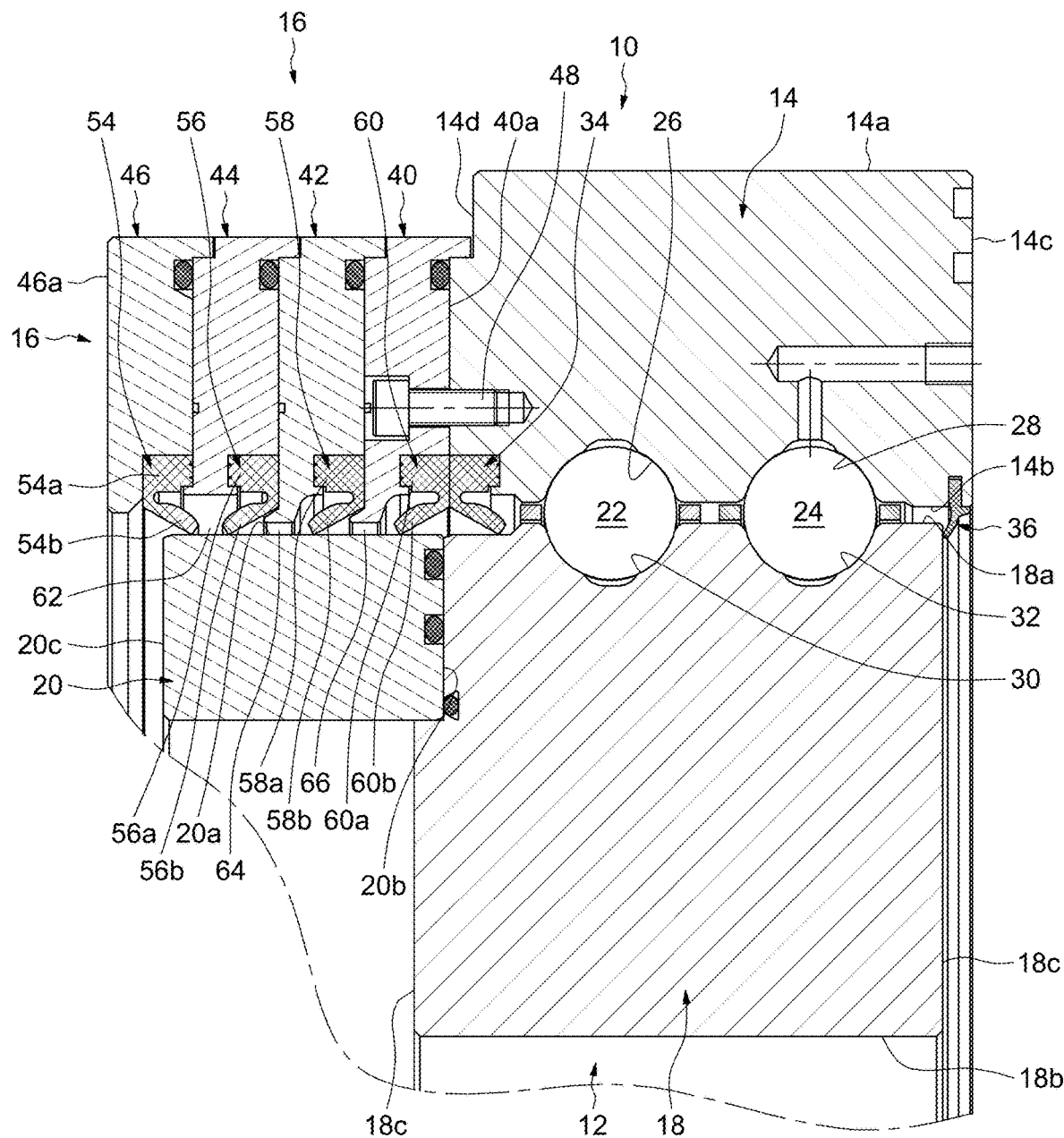
FIG. 1 is a cross-sectional view through a rolling-element bearing according to a first embodiment of the present disclosure.

The rolling-element bearing as illustrated on FIG. 1 is a large-diameter rolling-element bearing comprising a first ring assembly 10 and a second ring assembly 12. In the illustrated example, the first ring assembly 10 is the outer ring whereas the second ring assembly 12 is the inner ring. The rolling-element bearing may for example be used in a tidal or marine turbine power station a tunnel boring machine, a wind turbine, a big offshore crane or any other applications using a large diameter rolling-element bearing.

The outer and inner ring assemblies 10, 12 are concentric and extend axially along the bearing rotation axis (not shown) which runs in an axial direction. In this illustrated example, the rings 10, 12 are of the solid type.

The outer ring assembly 10 comprises a rolling ring 14 and a sealing ring 16 secured to the rolling ring 14. The inner ring 12 also comprises a rolling ring 18 and a sealing ring 20 secured to the rolling ring 18. The sealing ring 16 of the outer ring radially surrounds the sealing ring 20 of the inner ring.

As will be described later, a plurality of successive seal elements are provided radially between the sealing rings 16, 20.

In the illustrated example, the rolling-element bearing also comprises two rows of balls 22, 24 which are arranged between first raceways 26, 28 of the rolling ring 14 of the outer ring and second raceways 30, 32 of the rolling ring 18 of the inner ring.

The rolling ring 18 of the inner ring comprises an outer cylindrical surface 18a from which the raceways 30, 32 are formed. The raceways 30, 32 are oriented radially outwards. The rolling ring 18 also comprises an inner cylindrical surface or bore 18b which is radially opposite the outer surface 18a. The rolling ring 18 further comprises two opposite first and second frontal surfaces 18c, 18d which axially delimit the outer surface 18a and the bore 18b. The frontal surfaces 18c, 18d delimit the axial thickness of the rolling ring 18.

The rolling ring 14 of the outer ring comprises an outer cylindrical surface 14a and an inner cylindrical bore 14b which is radially opposite the outer surface 14a and from which the raceways 26, 28 are formed. The raceways 26, 28 are oriented radially inwards. The rolling ring 14 further comprises two opposite first and second frontal surfaces 14c, 14d which axially delimit the outer surface 14a and the bore 14b. The frontal surfaces 14c, 14d delimit the axial thickness of the rolling ring 14.

The rolling-element bearing further comprises, axially on each side of the rolling rings 14 and 18, an annular seal 34, 36 mounted on the rolling ring 14 and provided to close the radial space that exists between the rolling rings 14, 18. This radial space is defined between the bore 14b of the rolling ring 14 and the outer surface 18a of the rolling ring 18. An annular closed rolling space (not referenced) is defined between the rolling rings 14, 18 and the seals 34, 36 in which the rows of balls 22, 24 are housed. Advantageously, the rolling space is filled with lubricant.

Each seal 34, 36 is mounted into a groove (not referenced) formed on the cylindrical bore 14b of the rolling ring 14 and comes into contact with the rolling ring 18. The seal 34 comes into contact with the outer surface 18a of the rolling ring 18. The seal 36 comes into contact with the frontal surface 18c of the rolling ring 18. Alternatively, it could be possible to provide a reversed arrangement for at least one of the seals 34, 36 with the seal mounted on the rolling ring 18 and coming into friction contact with the rolling ring 14.

The sealing ring 16 of the outer ring is mounted axially into contact against the frontal surface 14d of the rolling ring 14. The sealing ring 16 protrudes axially with respect to the rolling ring 14. The sealing ring 16 is removably attached or secured to the rolling ring 14. The sealing ring 16 radially surrounds the sealing ring 20 of the inner ring. Each of the sealing rings 16, 20 may be made of stainless steel or treated steel with a painting or anti-corrosion treatment.

In the illustrated example, the sealing ring 16 is formed as a split ring and comprises first, second, third and fourth part rings (ring sections) 40 to 46 stacked one relative to the other in the axial direction. Alternatively, the sealing ring 16 may be made in one part.

The first part ring 40 is removably secured to the rolling ring 14 by screws 48 spaced apart in the circumferential direction. The first part ring 40 axially abuts against the frontal surface 14*d* of the rolling ring 14. Similarly, the second part ring 42 is removably secured to the first part ring 40 by screws (not shown) on the side axially opposite the rolling ring 14. The third part ring 44 is removably secured to the second part ring 42 by screws 50 (FIG. 3) on the side axially opposite the first part ring 40. The fourth part ring 46 is removably secured to the third part ring 44 by screws (not shown) on the side axially opposite the second part ring 42. The heads of the screws of the first part ring 40 may be covered by potting material and embedded inside this material. Hence, the associated threads of the screws are sealed.

As previously mentioned, a plurality of successive annular seals are provided radially between the sealing ring 16 of the outer ring and the sealing ring 20 of the inner ring.

In the illustrated example, the rolling-element bearing has first, second, third and fourth successive seals 54, 56, 58, 60 supported by the sealing ring 16 of the outer ring. The sealing ring 16 supports the seals 54, 56, 58, 60. The seals 54, 56, 58, 60 are arranged successively in the axial direction.

The first, second, third and fourth successive seals 54, 56, 58, 60 are respectively mounted on the fourth, third, second and first part rings 46, 44, 42, 40 of the sealing ring. Hence, the fourth seal 60 is axially located on the side of the rolling ring 14, the first seal 54 is axially located on the exterior side of the rolling-element bearing, and the second and third seals 56, 58 are axially disposed between these two seals. The third seal 58 is axially locally inwards with respect to the first and second seals 54, 56. The fourth seal 60 is axially locally inwards with respect to the third seal 58.

Each seal 54, 56, 58, 60 has an annular heel 54*a*, 56*a*, 58*a*, 60*a* and with an annular friction lip 54*b*, 56*b*, 58*b*, 60*b* projecting from the heel. In the illustrated example, each friction lip 54*b*, 56*b*, 58*b*, 60*b* extends inwardly from the heel 54*a*, 56*a*, 58*a*, 60*a*. Here, each friction lip 54*b*, 56*b*, 58*b*, 60*b* extends obliquely. In the illustrated example, the lips 56*b*, 58*b*, 60*b* extend obliquely outwards while the lip 54*b* extends obliquely inwards. The lip 54*b* extend toward the lip 56*b*.

The heel 54*a*, 56*a*, 58*a*, 60*a* of each seal is mounted in axial and radial contact against the associated fourth, third, second and first part ring 46, 44, 42, 40 of the sealing ring. Here, the heel 60*a* of the fourth seal also axially abuts against the seal 34.

Each lip 54*b*, 56*b*, 58*b*, 60*b* comes into friction contact with the sealing ring 20 of the inner ring. The lips 54*b*, 56*b*, 58*b*, 60*b* come into friction contact with the outer surface of the sealing ring 20. The contact between each lip 54*b*, 56*b*, 58*b*, 60*b* and the sealing ring 20 is radial. The lips 54*b*, 56*b*, 58*b*, 60*b* are flexible in the radial direction. Preferably, the free end of each lip has a triangular shape in cross-section in order to reduce friction.

In the illustrated example, the seals 54, 56, 58, 60 are identical to each other. Alternatively, the seals 54, 56, 58, 60 may be different to one another. In the illustrated example, the rolling-element bearing comprises four seals 54, 56, 58, 60. The number of seals may be different. For example, the rolling-element bearing may comprise at least two seals. The seals 54, 56, 58, 60 may be made of elastomeric material, for example polyurethane.

The lips 54*b*, 56*b* of the first and second seals delimit between the sealing ring 16 of the outer ring and the sealing ring 20 of the inner ring a first chamber 62.

Similarly, the lips 56*b*, 58*b* of the second and third seals delimit between the sealing rings 16, 20 a second chamber 64. The second chamber 64 is offset axially inward with respect to the first chamber 62. The lips 58*b*, 60*b* of the third and fourth seals delimit between the sealing rings 16, 20 a third chamber 66. The third chamber 66 is offset axially inward with respect to the second chamber 64. The chamber 64 is located axially between the first and second chambers 62, 66. The first, second and third chambers 62 to 66 are axially successive.

The sealing ring 20 of the inner ring is removably attached or secured to the rolling ring 18 by screws (not shown). The heads of the screws may be covered by potting material and embedded inside this material. Hence, the associated threads of the screws are sealed. The sealing ring 20 is mounted in axially contact against the frontal surface 18*c* of the rolling ring 18. The sealing ring 20 protrudes axially with regard to the rolling ring 18.

The sealing ring 20 comprises an outer cylindrical surface 20*a* and an inner cylindrical surface or bore (not referenced) which is radially opposite the outer surface 20 and two opposite first and second frontal surfaces 20*b*, 20*c* which axially delimit the outer surface 20*a* and the bore. The frontal surfaces 20*b*, 20*c* delimit the axial thickness of the sealing ring 20. The frontal surface 20*b* of the sealing ring is mounted axially into contact against the frontal surface 18*c* of the rolling ring 18. The friction lips 54*b*, 56*b*, 58*b*, 60*b* of the first, second, third and fourth successive seals 54, 56, 58, 60 come into friction contact with the outer surface 20*a* of the sealing ring.

Figure 2:
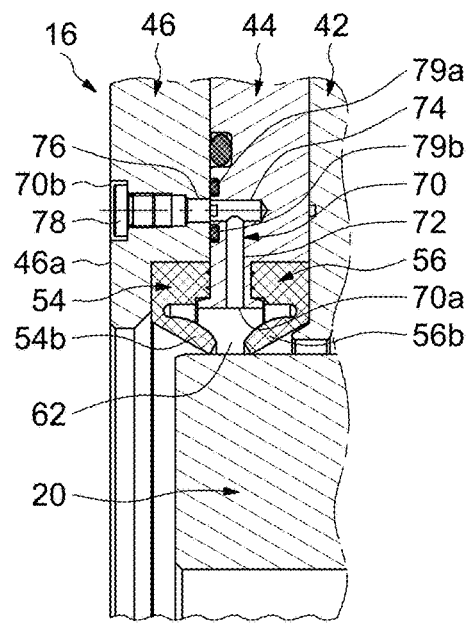
FIGS. 2 to 4 are partial cross-sectional views of the rolling-element bearing of FIG. 1 taken through other cutting planes.

As shown on FIG. 2, the rolling-element bearing comprises a first purging channel 70 extending through the sealing ring 16 of the outer ring 12 and in fluidic communication with the first chamber 62 delimited by the lips 54*b*, 56*b* of the first and second seals 54, 56. In use, the purging channel 70 enables any fluid which may enter inside the sealed first chamber 62 to be evacuated. Prior to operation, the purging channel 70 may be used to introduce lubricant, preferably grease, into the chamber 62. Such lubricant forms an additional barrier against the ingress of contaminants.

The purging channel 70 has an inlet orifice 70*a* opening into the first chamber 62. The inlet orifice 70*a* opens on the bore of the sealing ring 16 axially between the lips 54*b*, 56*b* of the first and second seals.

The purging channel 70 also has an outlet orifice 70*b* opening on the frontal surface 46*a* of the sealing ring which is axially opposite the first rolling ring 14 (FIG. 1). The frontal surface 46*a* is oriented axially outwards and is accessible from outside the rolling-element bearing. The frontal surface 46*a* is located on the fourth part 46 of the sealing ring. The frontal surface 46*a* is located axially on the side opposite of the third part 44. The frontal surface 40*a* (FIG. 1) of the first part is in contact with the rolling ring 14 and the frontal surface 46*a* of the fourth part delimits the axial thickness of the sealing ring 16.

The purging channel 70 is made of several holes or bores in the sealing ring 16. The purging channel 70 comprises a first radial hole 72 extending from inlet orifice 70*a* and a second axial hole 74 connected to the first radial hole 72, the holes being both formed in the thickness of the third part 44 of the sealing ring.

Alternatively, the purging channel 70 may comprise several radial holes 72 each having an inlet orifice 70*a* opening into the first chamber 62 and each connected to the second axial hole 74. In this case, the radial holes 72 are spaced apart in the circumferential direction.

The purging channel 70 also comprises a third axial hole 76 axially aligned with the second axial hole 74 and formed in the thickness of fourth part 46 of the sealing ring. The third axial hole 76 has the outlet orifice 70*b*.

The rolling-element bearing also comprises a first closing plug 78 attached at the outlet orifice 70b of the purging channel. The closing plug 78 may be attached to the outlet orifice 70b by any appropriate means, for example by screwing. Preferably, the closing plug 78 is made of transparent material in order to allow visual detection of the presence of contaminant fluid during an inspection of the rolling-element bearing. In the illustrated example, the closing plug 78 does not radially protrude with respect to the frontal surface 46a of the fourth part of the sealing ring. The closing plug 78 may be covered by potting material and embedded inside this material. Hence, the associated thread of the closing plug 78 is sealed.

In the illustrated example, the rolling-element bearing further includes two successive annular sealing members 79a, 79b axially interposed between the third and fourth parts of the sealing ring 16. The sealing members 79a, 79b are arranged successively in the radial direction. The sealing members 79a, 79b may be made of elastomeric material, for example polyurethane.

The sealing member 79a radially surrounds the purging channel 70 and the sealing member 79a is offset radially inwards with respect to the purging channel.

Prior to use of the rolling-element bearing, the purging channel 70 may also be used to introduce a fluid radially between the sealing members 79a, 79b at the junction between the third and fourth parts of the sealing ring 16. Hence, the effectiveness of the sealing members 79a, 79b may be tested. The introduced fluid may be compressed air, lubricant, colored liquid, etc.

Figure 3:
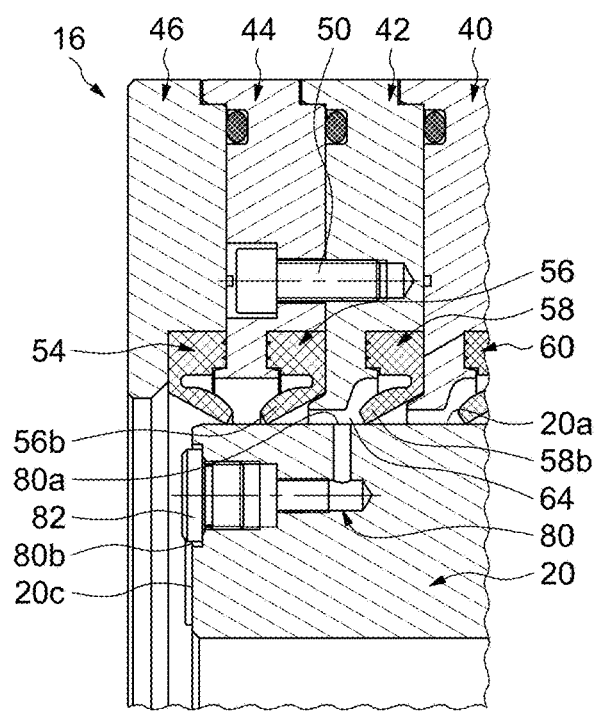

As shown on FIG. 3, the rolling-element bearing comprises a second purging channel 80 extending through the inner ring 12 and in fluidic communication with the second chamber 64 delimited by the lips 56b, 58b of the second and third seals 56, 58. In use, the purging channel 80 enables any fluid which has entered inside the sealed chamber 64 to be evacuated. Prior to use, the purging channel 80 may be used to introduce lubricant, preferably grease, into the chamber 64. Such lubricant forms an additional barrier against the ingress of contaminants.

In the illustrated example, the purging channel 80 extends through the sealing ring 20 of the inner ring. The purging channel 80 has an inlet orifice 80a opening into the second chamber 64. The inlet orifice 84a opens on the outer surface of the sealing ring 20 axially between the lips 56b, 58b of the second and third seals 56, 58.

The purging channel 80 also has an outlet orifice 80b opposite the inlet orifice 80a and opening on the frontal surface 20c of the sealing ring which is accessible from the outside of the rolling-element bearing. Similarly to the purging channel 70, the purging channel 80 is made of several holes provided into the thickness of the sealing ring 20.

The rolling-element bearing also comprises a second closing plug 82 attached at the outlet orifice 80b of the purging channel. The closing plug 82 may be attached to the outlet orifice 80b by any appropriate means, for example by screwing. Preferably, the closing plug 82 is made of transparent material in order to allow the visual detection of the presence of contaminant fluid during an inspection of the rolling-element bearing. In the illustrated example, the closing plug 82 axially protrudes with respect to the frontal surface 20c of the sealing ring. The closing plug 82 may be covered by potting material and embedded inside this material. Hence, the associated thread of the closing plug 82 is sealed.

In the illustrated example, the purging channel 80 only extends through the sealing ring 20. Alternatively, the purging channel 80 may extend through the sealing ring 20 and the rolling ring 18 of the inner ring.

Figure 4:
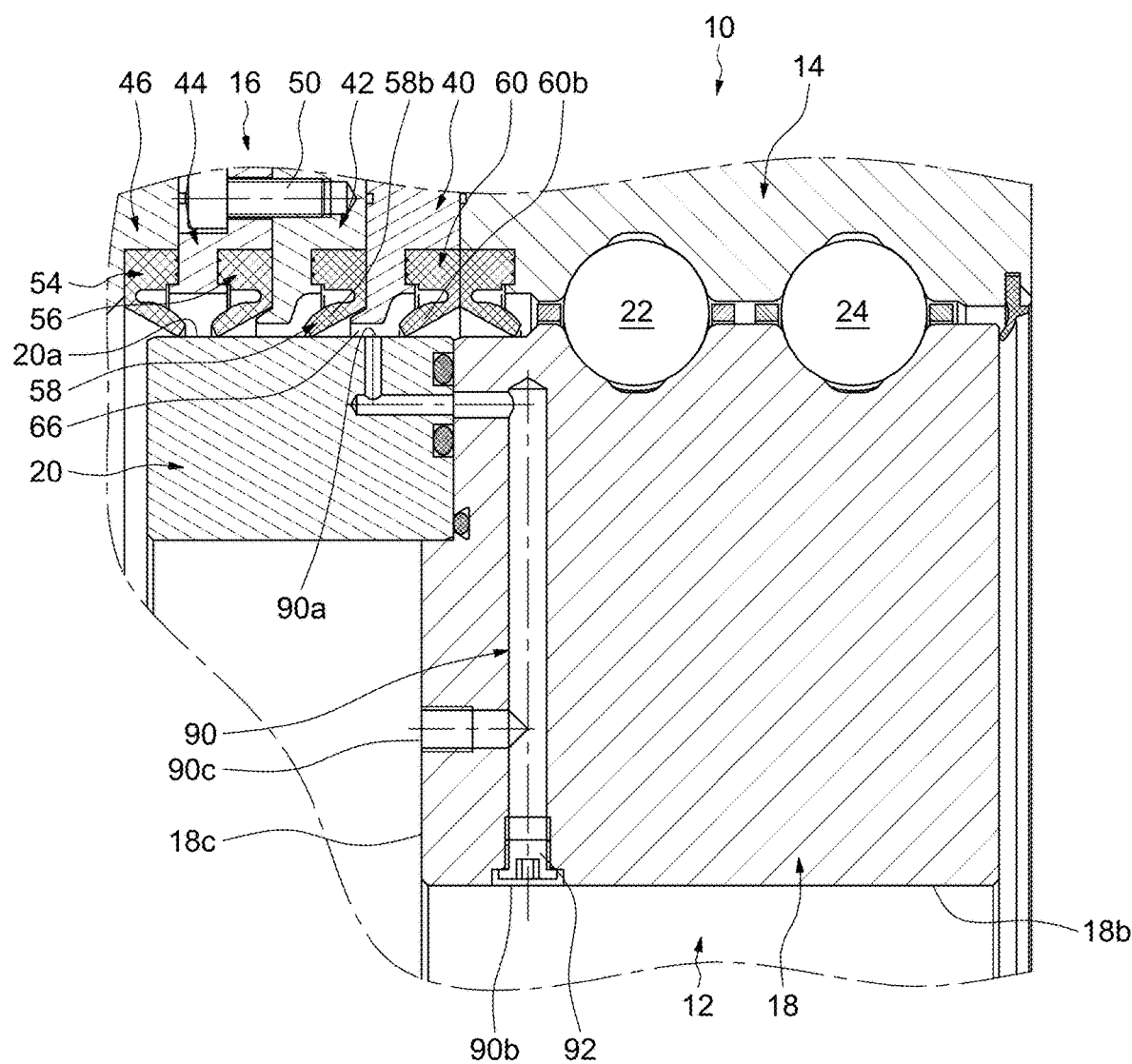

As shown on FIG. 4, the rolling-element bearing further comprises a third purging channel 90 extending through the inner ring 12 and in fluidic communication with the third chamber 66 delimited by the lips 58b, 60b of the third and fourth seals 58, 60. In use, the purging channel 90 enables any fluid that has entered inside the sealed chamber 66 to be evacuated. Prior to use, the purging channel 90 may be used to introduce lubricant, preferably grease, inside the chamber 66. Such lubricant forms an additional barrier against the ingress of contaminants. In a preferred embodiment, lubricant is provided only inside the second and third chambers 64, 66. In such case, the aim of the first purging channel 70 is only to evacuate the fluid which can enter inside the first chamber 62.

In the illustrated example, the purging channel 90 extends through the sealing ring 20 and the rolling ring 18 of the inner ring. The purging channel 90 has an inlet orifice 90a opening into the third chamber 66. The inlet orifice 90a opens on the outer surface of the sealing ring 20 axially between the lips 58b, 60b of the third and fourth seals.

The purging channel 90 is also provided with a first outlet orifice 90b opposite the inlet orifice 90a and opening on the bore 18b of the rolling ring 18 which is accessible from the outside of the rolling-element bearing. In the illustrated example, the purging channel 90 further includes a second outlet orifice 90c opposite the inlet orifice 70a and opening on the frontal surface 18c of the rolling ring 18 which is accessible from the outside of the rolling-element bearing. Alternatively, the purging channel 90 have only the outlet orifice 90b or the outlet orifice 90c.

Similarly to the purging channels 70 and 80, the purging channel 90 is made of several holes provided into the thickness of the scaling ring 20 and the rolling ring 18.

The rolling-element bearing also comprises a first closing plug 92 attached at the outlet orifice 90b of the purging channel. The closing plug 92 may be attached to the outlet orifice 90b by any appropriate means, for example by screwing. Preferably, the closing plug 92 is made of transparent material in order to enable the visual detection of the presence of contaminant fluid during an inspection of the rolling-element bearing. In the illustrated example, the closing plug 92 does not radially protrude with respect to the bore 18b of the rolling ring. The closing plug 92 may be covered by potting material and embedded inside this material. Hence, the associated thread of the closing plug 92 is sealed.

As previously mentioned, in the illustrated example, the purging channel 90 also includes second outlet orifice 90c. The rolling-element bearing may include a plug or a sensor (not illustrated) mounted at the outlet orifice 90c to detect water.

In the illustrated example, the purging channel 90 extends through the sealing ring 20 and the rolling ring 18 of the inner ring. Alternatively, the purging channel 90 may only extend through the sealing ring 20.

Figure 5:
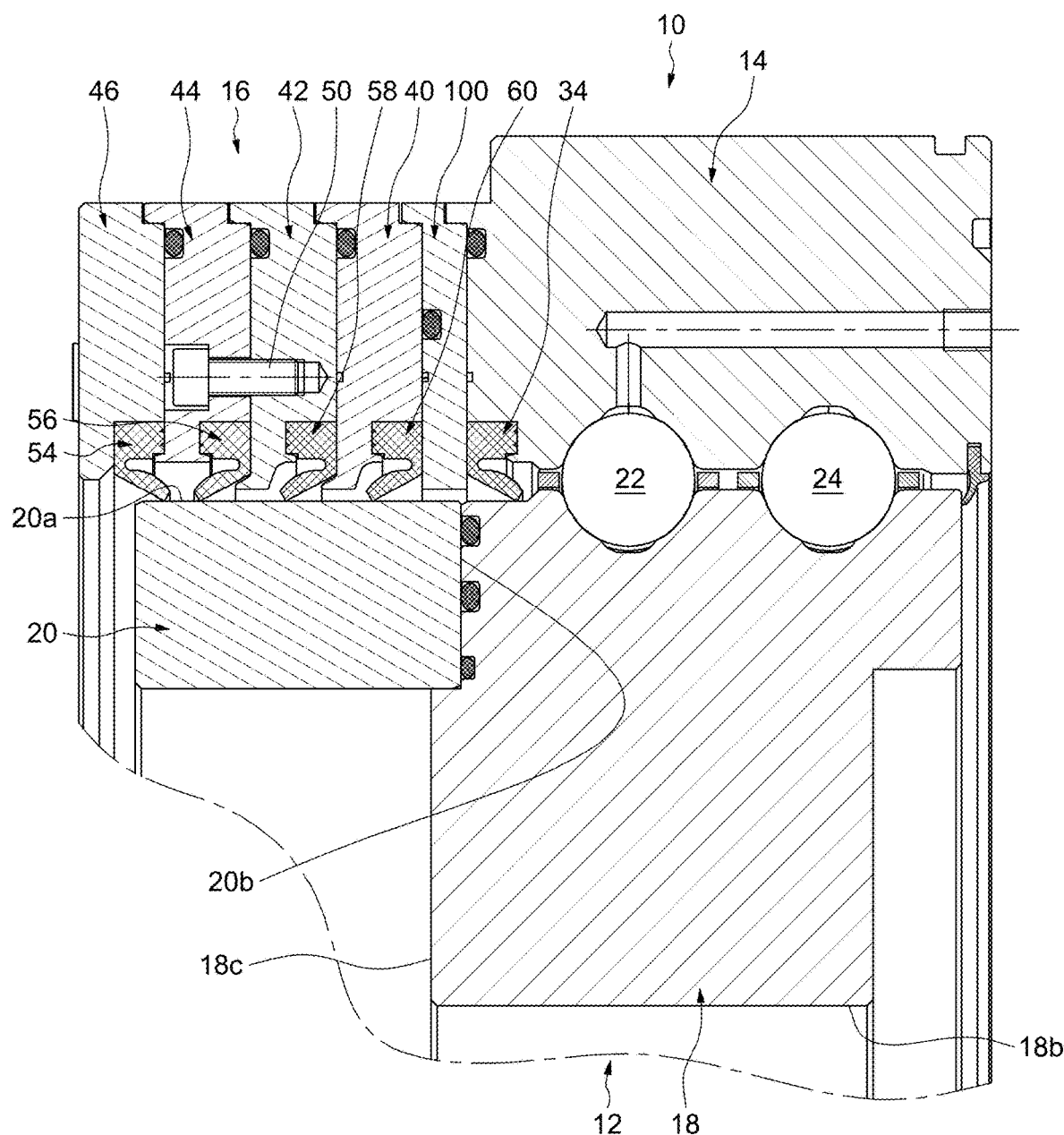
FIG. 5 is a cross-section of a rolling-element bearing according to a second embodiment of the present disclosure.

The example shown on FIG. 5, in which identical parts are given identical references, differs from the first example in that the sealing ring 16 of the outer ring includes a spacer 100 interposed axially between the rolling ring 14 and the first part ring 40. Here, the fourth seal 60 is axially spaced with respect the seal 34. In this example, the axial length of the sealing ring 20 of the inner ring is increased.

The spacer 100 allows the lips of the seals 54, 56, 58, 60 to adopt two different axial positions, namely the first one with this spacer and the second one with the removing of the spacer and the axial contact of the first part 40 directly against the rolling ring 14. By removing the spacer 100, the seals 54, 56, 58, 60 are axially displaced along the outer surface 20a of the sealing ring of the inner ring.

Otherwise, as previously mentioned, in the illustrated examples, the first ring assembly of the rolling-element bearing is the outer ring whereas the second ring assembly is the inner ring. As an alternative, it could be possible to provide a reversed arrangement with the first ring assembly forming the inner ring and the second ring assembly forming the outer ring.

In the described examples, the rolling-element bearing comprises two rows of rolling elements. Alternatively, the rolling-element bearing may comprise only one row of rolling elements, or three or more rows of rolling elements. In the illustrated example, the rolling elements are balls. The rolling-element bearing may comprise other types of rolling elements, for example rollers.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved rolling-element bearings.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

What is claimed is:

1. A rolling-element bearing comprising:
   a first ring assembly and a concentric second ring assembly mounted for rotation relative to the first ring assembly,
   the first ring assembly comprising a first rolling ring having a raceway and a first sealing ring, a first axial surface of the first sealing ring facing away from the first rolling ring and a second axial surface of the first sealing ring abutting the first rolling ring at a first joint, the first sealing ring supporting a first seal element and a second seal element, the second seal element being located axially between the first seal element and the first rolling ring,
   the second ring assembly comprising a second rolling ring having a raceway and a second sealing ring mounted axially to the second rolling ring at a second joint, the second sealing ring having a first axial surface facing away from the second rolling ring and a second axial surface abutting the second rolling ring at the second joint,
   a row of rolling elements between the raceway of the first rolling ring and the raceway of the second rolling ring,
   wherein the first seal element includes a first lip in contact with the second sealing ring and the second seal element includes a second lip in contact with the second sealing ring, the first lip and the second lip delimiting a first chamber between the first sealing ring and the second sealing ring,
   wherein the first lip and the second lip extend obliquely toward each other, and
   wherein a first purging channel extends from a first inlet orifice at the first chamber to at least one external surface of the first ring assembly.

2. The rolling-element bearing according to claim 1, wherein the at least one external surface is the first axial surface of the first sealing ring.

3. The rolling-element bearing according to claim 2, further comprising at least one closing element removably attached at an outlet orifice of the first purging channel.

4. The rolling-element bearing according to claim 3, wherein the closing element is transparent.

5. The rolling-element bearing according to claim 2, wherein the first sealing ring includes at least one third seal element located axially between the second seal element and the first rolling ring, each of the at least one third seal element having a third lip in contact with the second sealing ring, the third lip of the at least one third seal element and the second lip delimiting a second chamber between the first and second seal rings.

6. The rolling-element bearing according to claim 5, wherein a second purging channel includes an inlet orifice opening into the second chamber and extends to an external surface of the second ring assembly.

7. The rolling-element bearing according to claim 6, wherein the external surface of the second ring assembly is the first axial surface of the second sealing ring.

8. The rolling-element bearing according to claim 2, wherein the first sealing ring includes a third seal element having a third lip in contact with the second sealing ring and a fourth seal element having a fourth lip in contact with the second sealing ring,
   wherein the third seal element is located axially between the second seal element and the first rolling ring and the fourth seal element is located axially between the third seal element and the first rolling ring,
   wherein the third lip and the fourth lip delimit between the first sealing ring and the second sealing ring a third chamber.

9. The rolling-element bearing according to claim 8, wherein a third purging channel extends from an inlet orifice opening into the third chamber to an external surface of the second ring assembly.

10. The rolling-element bearing according to claim 9, wherein the external surface of the second ring assembly is a first axial end surface of the second rolling ring.

11. The rolling-element bearing according to claim 2, wherein the first sealing ring comprises a plurality of axially stacked first sealing ring sections including a first sealing ring section supporting the first seal element and a second sealing ring section supporting the second seal element.

\* \* \* \* \*